United States Patent Office 3,433,022
Patented Mar. 18, 1969

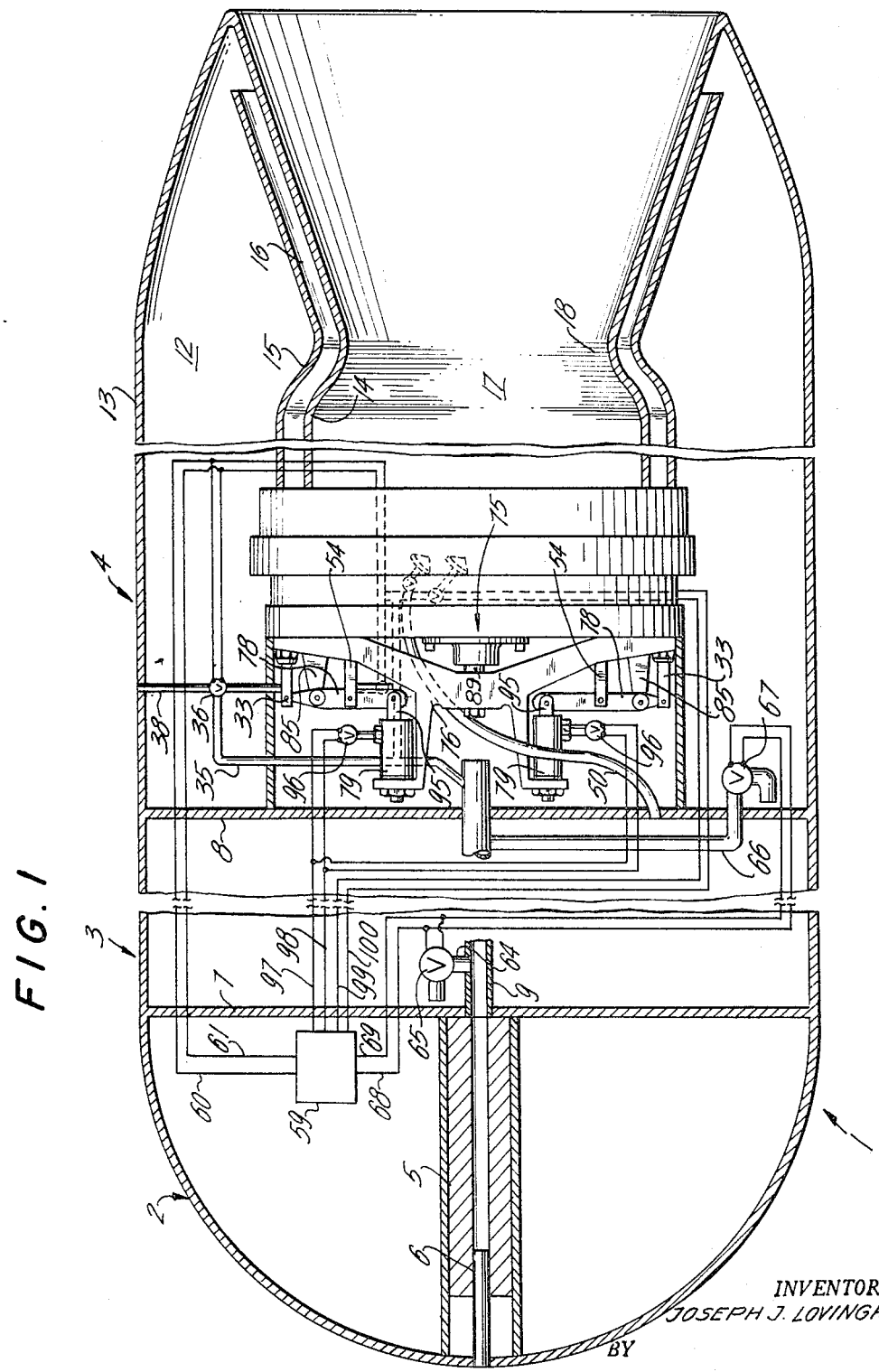

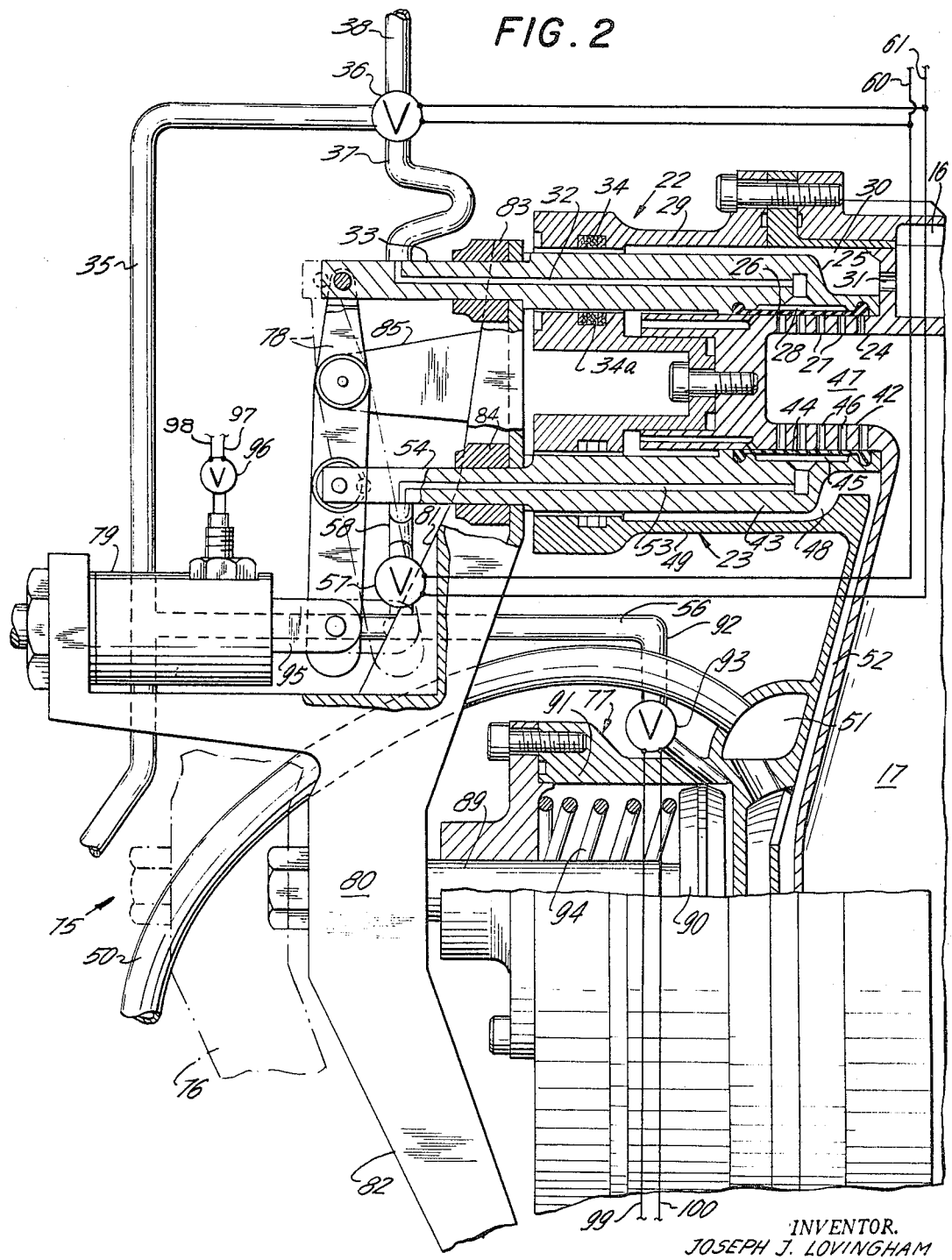

3,433,022
CONTROL FOR ADJUSTING PROPORTIONS OF BI-PROPELLANTS
Joseph J. Lovingham, Madison, N.J., assignor to Thiokol Chemical Corporation, Bristol, Pa., a corporation of Delaware
Filed Jan. 23, 1967, Ser. No. 611,024
U.S. Cl. 60—258
Int. Cl. F02k 9/02
8 Claims

ABSTRACT OF THE DISCLOSURE

In a system for controlling the flow of liquids, and especially bi-propellants to the combustion chamber of a rocket engine, a valve for each liquid and operating mechanism connecting the valves for actuation as a unit to increase or decrease the rate of flow of the liquids simultaneously, or relative to each other to change the relative rates of flow.

---

The present invention relates to rocket engines and more particularly to a control mechanism for regulating the flow of bi-propellants to the combustion chamber of such engines.

Energy management and propellant conservation are always important in all kinds of transportation but in space travel where in-flight mass is severely limited, conservation of propellant and in-flight mass control becomes mandatory. Propellant management concepts have been employed heretofore to control propellant use and outage losses. These concepts often use the pressure drop in the upstream end of a feed system, tank pressure and other similar factors which can be sensed to control flow. However, these systems become impractical when the injection area is to be varied because any upstream pressure drop is small compared to the ignition orifice drop at reduced thrust levels.

One of the objects of the present invention is to provide a control mechanism which will vary the proportion of different propellants being delivered to a combustion chamber for producing the proper mixture for maximum efficiency.

Another object is to provide a control mechanism which will simultaneously vary the flow rate of bi-propellant liquids and vary the ratio of the different bi-propellants in accordance with requirements.

Still another object is to provide a control mechanism of the type indicated which is of simple and compact construction, economical to manufacture and one which may be operated by remote control to accurately regulate the proportion of fuel to oxidizer delivered to a combustion chamber.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:
FIGURE 1 is a longitudinal sectional view of a rocket engine incorporating the control mechanism of the present invention; and
FIGURE 2 is an enlarged view of a portion of the control illustrated in FIGURE 1 and showing the mechanism for actuating the control valves simultaneously, and the linkage for moving the valves relative to each other.

The present invention may be used with other arrangements, but it is particularly adapted for use with a control mechanism of the kind described and claimed in a co-pending application filed concurrently herewith for delivering bi-propellants to the combustion chamber of a rocket engine. The rocket engine 1 to which the invention is shown applied comprises a forward section 2, an intermediate section 3 and a rearward section 4. The forward section 2 is adapted to carry a pay load and has a gas generator 5 therein at its axis for producing a gas at a desired pressure. The gas generator 5 may be of any conventional type, but in the illustrated embodiment comprises a hollow grain of solid propellant having an igniter 6. Operation of igniter 6 may be initiated by any suitable control to ignite the solid propellant and thereby produce gas under pressure.

The intermediate section 3 is in the form of a tank for a propellant, such as oxidizer, and is separated from the forward section 2 and rearward section 4 by transverse walls or bulkheads 7 and 8. The intermediate section 3 also has an axial tube 9 extending rearwardly from the gas generator 5 through the bulkheads 7 and 8 and into the rearward section 4.

The rearward section 4 of the rocket engine 1 comprises a peripheral tank 12 for another liquid propellant, such as fuel, and the tank is formed between outer and inner peripheral walls 13 and 14. Preferably, the tank 12 has a guide plate 15 therein forming a channel 16 through which liquid fuel is caused to flow by pressurizing forces acting thereon. The inner wall 14 of the rearward section 4 forms a cylindrical combustion chamber 17 and the wall 14 is shaped to form an outlet nozzle 18 adjacent the rearward end of the engine through which the products of combustion escape to produce a forward thrust thereon.

As shown in FIGURE 2, a valve arrangement is provided like that described and claimed in the application filed concurrently herewith for controlling the flow of bi-propellants. This arrangement comprises one valve 22 for controlling the flow of one liquid propellant, such as fuel, and another valve 23 for controlling another liquid propellant, such as an oxidizer. The valve 22 comprises a cylindrical valve seat 24 formed as a continuation of the inner peripheral wall 14, a valve carrier 25 slidable along the valve seat and a flexible valve closure sleeve 26 of an elastomeric material movable with the sliding carrier as well as relative thereto. The cylindrical valve seat 24 has a plurality of orifice ports 27 therein and the sliding valve carrier 25 is a ring surrounding the valve seat and ports. As shown in FIGURE 2, the sliding carrier 25 has an annular recess 28 in which the flexible valve closure is located for sliding movement with the carrier and for radial movement relative thereto. Surrounding the valve carrier 25 is an outer annular wall 29 forming a chamber 30 in which the carrier slides and the chamber has an inlet port 31 communicating with the channel 16 through which liquid fuel is supplied to the chamber. Valve carrier 25 also has a port 32 for delivering pressurized motive fluid to the annular recess 28 at the outer periphery of the flexible valve closure 26 and the port extends along the valve carrier parallel to its axis and through a stem 33 projecting outwardly from the chamber 30. Surrounding the annular valve carrier 25 are annular packing rings 34 and 34a for sealing the carrier in the outer and inner walls of the chamber. Thus, the valve carrier 25 and sleeve 26 mounted in the annular recess 28 may slide as a unit along the valve seat 24 to uncover successive orifice ports 27, and the flexible sleeve 26 may be actuated radially inward toward the valve seat by motive fluid to close the orifice ports underlying the carrier.

The motive fluid for actuating the flexible valve closure sleeve 26 is supplied from the gas generator 5 through the axial tube 9, see FIGURE 1, and from the tube adjacent its rearward end through a conduit 35 to a two-way auxiliary valve 36 connected to the port 32 in the valve stem 33 by a flexible hose connection 37. Another conduit 38 extends from the two-way valve 36 to the atmosphere through the outer peripheral wall 13 of the rocket engine 1. The auxiliary valve 36 in one position supplies motive fluid from conduit 35 to the annular recess 28 to flex the closure sleeve 26 toward the underlying valve ports 27 and in its other position shuts off the supply of motive fluid and connects the annular recess to the atmosphere. When the valve 36 is in the latter position fuel in the chamber 30 flows under the rearward end of the valve carrier 25, flexes the sleeve radially outward and then flows through the open valve ports.

The flow of oxidizer is controlled in a similar manner by valve 23 having a cylindrical valve seat 42, a sliding valve carrier 43 at the inner periphery of the seat and a flexible valve closure sleeve 44 mounted in an annular recess 45 on the outer periphery of sliding valve carrier. The valve seat 42 has radial orifice ports 46 therein, the same as valve seat 24, and these ports are located opposite the ports 27 to provide an annular space 47 therebetween in the combustion chamber 17. The valve carrier 43 slides in a chamber 48 formed between the cylindrical valve seat 42 and an inner cylindrical wall 49. Liquid oxidizer is supplied to the right hand end of the annular chamber 48 as viewed in FIGURE 2 from the intermediate section 3 constituting a tank, see FIGURE 1, and through a conduit 50 into an annular distributing chamber 51 and then outwardly through radial passage 52. Valve carrier 43 has an axial port 53 for motive fluid extending parallel to its axis and through a valve stem 54 projecting forwardly, the same as the valve carrier 25.

Motive fluid is supplied to the sliding valve carrier 43 from the gas generator 5, see FIGURE 1, through the axial tube 9 conduit 56 having an auxiliary two-way valve 57, and from the two-way valve through a flexible and extensible conduit 58 to the axial port 53 in a valve stem 54. Two-way valve 57 supplies motive fluid to the annular recess 45 in one position and shuts off the supply of motive fluid and exhausts the recess to the atmosphere in another position.

The two-way valves 36 and 57 may be operated by any suitable mechanism and in the illustrated embodiment, an instrument 59 of a remotely controlled telecommunication system is shown having electric lines 60 and 61 connected to the valves. The valves 36 and 57 are operated by the instrument 50 through the telecommunication system from a position where the motive fluid under pressure is supplied against the flexible valve closure sleeves 26 and 44 to close the underlying orifice ports 27 and 46, and in another position to release the sleeves to permit flow of fuel and oxidizer through the orifice ports into the combustion chamber. Thus, the opening and closing of the orifice ports 27 and 46 constitutes a pulsing of the flow of propellants and thrust applied to the rocket engine 1, and the length of time during which the ports are open determines the period of the pulse which may be varied in accordance with requirements.

The liquid fuel and oxidizer are pressurized by gas from the gas generator to ensure flow into the combustion chamber 17. The pressurized gas flows through the tube 9 to the forward ends of the tanks 3 and 12 formed by the bulkheads 7 and 8. To this end a conduit 64 having a valve 65 therein, see FIGURE 1, extends from the tube 9 to a position adjacent the bulkhead 10, and a similar conduit 66 having a valve 67 therein extends from the tube 9, to a position adjacent the bulkhead 8. Opening and closing of the valves 65 and 67 is controlled by the telecommunication instrument 59 through electric lines 68 and 69 connected to the valves and operable upon a remote control signal to open the valve. As thus far described the rocket engine and main control valves 22 and 23 are substantially the same as those described and claimed in the application referred to above and filed concurrently herewith.

In accordance with the present invention a control mechanism is provided for actuating the control valves 22 and 23 simultaneously to supply both fuel and oxidizer to the combustion chamber 17, or relative to each other to vary the relative amounts of fuel and oxidizer supplied to the combustion chamber. Preferably, the operation of the improved control mechanism is initiated from the telecommunication system previously described as, for example, by signals from the earth to the rocket engine while in flight.

The improved control mechanism is indicated generally by the reference character 75 and comprises a yoke 76 operated by a motor 77 and connected to operate the valve carriers 25 and 43 simultaneously and in unison; and one or more link mechanisms 78 connected to the separate valves and operated by a motor or motors 79 to move the valves relative to each other. Yoke 76 may have other shapes, but in the illustrated embodiment has a hub 80 and oppositely directed arms 81 and 82 arranged 180° apart. It will be understood, however, that three arms may be arranged 120° apart or four arms 90° apart. The stems 33 and 54 of the valves 22 and 23, respectively extend through the arms 81 and 82 which have bushings 83 and 84 in sliding engagement with the valve stems. Each of the arms 81 and 82 of the yoke 76 has a bracket 85 projecting forwardly therefrom between valve stems 33 and 54. Pivotally mounted on each bracket 85 is a link 78 to which the ends of the valve stems 33 and 54 are pivotally connected. Thus, when the yoke 76 moves forwardly it acts through the brackets 85 and links 78 to move the valve carriers 25 and 43 along the valve seats 24 and 42 in unison to uncover orifice ports 27 and 46, successively.

Yoke 76 is mounted on the end of a piston rod 89 which extends through its hub 80. The opposite end of the piston rod 89 is connected to a piston 90 movable in a cylinder 91 of the motor 77. The piston 90 is actuated by motive fluid from the gas generator 5 which flows through the tube 9 and conduit 92 connected to the cylinder and having a valve 93 therein. A spring 94 also is provided in cylinder 91, see FIGURE 2, for moving the piston 90 to the right. Valve 93 is a three-way valve for supplying motive fluid to the cylinder 91 in one position, shut off the supply of motive fluid and exhaust the cylinder in another position to permit the spring 94 to operate the piston to the right and shut off the supply of motive fluid to and from the cylinder in another position to hold piston and yoke in a particular adjusted position.

The valve carriers 25 and 43 are moved relative to each other to vary the relative volume of fuel and oxidizer supplied to the combustion chamber 17 to produce a required mixture by means of linkage mechanisms 78 and motors 79 arranged in parallel. While a single linkage mechanism 78 and motor 79 can be used, in the illustrated embodiment a link 78 and motor 79 is provided on each arm of the yoke 76. Each link 78 is in the form of a lever pivotally connected to the bracket 85 and valve stems 33 and 54 with one end extending radially inward beyond the valve stem 54 and pivotally connected to a piston rod 95 of a motor 79. When pressurized fluid is supplied to the motors 79 as controlled by the valves 96, the piston rods 95 of motors 79 are actuated from the position illustrated in full lines to that illustrated in dashed lines in FIGURE 2 and vice versa. Thus, the valve carrier 25 is moved forwardly simultaneously with a rearward movement of the valve carrier 43. Operation of the motors 79 and adjustment of the valve carriers 25 and 43 relative to each other are also controlled by the instrument 59 of the telecommunication system. To this end, lines 97 and 98 extend from the instrument 59 to the valves 96 for simultaneous operation while lines 99 and 100 are connected to control valves 93 for operating motor 77. One form of the invention having now been described in detail the mode of operation is next explained.

Assuming for purposes of description that the tanks 3 and 12 for oxidizer and fuel are completely filled and that all of the auxiliary valves 36 and 57; 65 and 67; 93 and 96 are closed. To initiate operation of the rocket engine a signal is given which, operating through the instrument 59 of the telecommunication system, initiates operation of the gas generator 5 to produce gas at high pressure. Simultaneously the valves 65 and 67 are actuated from the instrument 59 and gas under pressure flows through tube 9 and conduits 64 and 66 to the forward ends of the tanks. The pressurized fuel and oxidizer then flow into the chambers 30 and 48 surrounding the valve carriers 25 and 43 and enters the valve carriers 25 and 43 and flows under the flexible closure sleeves 26 and 44 which expand due to the pressure of the liquids so that the liquid escapes through the orifices 27 and 46 into the combustion chamber 17. Instead of supplying liquid fuel and oxidizer in this way the yoke 76 may be actuated against the action of spring 94 to move the valve carriers 25 and 43 to the left to uncover orifice ports 27 and 46 and two-way valves 36 and 57 actuated to supply motive fluid under pressure from the tube 9 through the conduits 37, 58 and ports 32 and 53 to force the annular sleeves to close the underlying orifice ports. Liquid fuel and oxidizer then flow through the uncovered ports 27 and 46 only, into the combustion chamber 17. Also, the valves 36 and 57 may be opened and closed intermittently to force the sleeves 26 and 44 into engagement with the orifice ports 27 and 46 to alternately close and open the ports as the valves are actuated from one to the other of their two positions. The amount of fuel and oxidizer supplied is then dependent upon the period of time during which the orifice ports are uncovered and depending upon the number of ports uncovered by the valve carriers 25 and 43.

In addition to supplying flow of fuel and oxidizer at a constant rate and at a controlled rate by pulsing, the control may be varied to adjust the relative amounts of fuel and oxidizer supplied to the combustion chamber 17. To this end, the motors 79 are supplied with a motive fluid as controlled by valves 96 to rock the links 78 on the brackets 85 to move the valve carrier 25 forwardly simultaneously with the rearward movement of the valve carrier 43. When the valve carrier 25 moves forward it will uncover more orifice ports 27 while the rearward movement of the carrier 43 covers more of the orifice ports 46.

It will now be observed that the present invention provides a control mechanism for constrolling the simultaneous flow rate of different propellants while at the same time permitting simultaneous control of the relative flow rates of the propellants. It will also be observed that the present invention provides a control mechanism of the type indicated which is of simple and compact construction, adapted for economical manufacture and one which is reliable in performing its intended function.

While a single embodiment of the invention is herein illustrated and described, it will be understood that changes may be made in the construction and arrangement of elements without departing from the spirit or scope of the invention. Therefore, without limitation in this respect, the invention is defined by the following claims:

What is claimed is:

1. In a system for controlling the flow of a liquid from a vessel, a wall associated with said vessel and having orifice ports therein arranged in spaced relation therealong a valve slidable on said wall, a valve actuator on which the valve is mounted for movement therewith and movement relative thereto, a motor for bodily moving the valve actuator and valve mounted thereon as a unit to slide the valve along said wall to cover and uncover the orifice ports therein, and a motor mounted on said valve actuator for moving the valve relative to the actuator to adjust the position of the valve on the actuator.

2. In a rocket engine of the type having separate tanks for containing separate propellant liquids, a combustion chamber having a wall associated with each of the separate tanks and each wall having orifice ports therein arranged in spaced relation therealong, means for supplying propellants from said separate tanks to said walls, a nozzle at one end of the rocket engine through which products of combustion flow to propel the engine, the combination with said elements of separate valves slidable along said walls to cover and uncover said orifice ports, a yoke, linkage mechanism on the yoke for connecting the valves for movement with the yoke as a unit, a motor connected to move the yoke and linkage for sliding the valves along the walls to cover and uncover the orifice ports therein, successively, and a motor on the yoke for actuating the linkage to adjust the valves relative to each other on the yoke and vary the relative amounts of the different liquid propellants supplied to the combustion chamber.

3. A rocket engine in accordance with claim 2 in which the walls having the orifice ports are cylindrical, the valves comprise rings with each having an annular recess overlying the orifice ports in the wall which it covers, and said valves having at least one stem extending through bearings in the yoke in which they may slide.

4. A rocket engine in accordance with claim 3 in which the linkage comprises at least one bracket on the yoke between the stems projecting from the annular valve rings, a lever pivotally mounted on the bracket intermediate its end and pivotally connected to the valve stems at opposite sides of the bracket, and the motor for actuating the linkage being connected to the lever to rock on the bracket.

5. A rocket engine in accordance with claim 4 in which each valve ring has a plurality of stems projecting therefrom in spaced relation around its periphery, and the linkage comprising a bracket, a lever and a motor for each valve stem to produce balancing forces acting on the valves.

6. A rocket engine in accordance with claim 2 in which a gas generator is provided to supply motive fluid to the motors for actuating the yoke and linkage, and control means for controlling the flow of motive fluid to the motors.

7. A rocket engine in accordance with claim 6 in which each valve comprises a ring having an annular recess overlying the orifice ports in the wall on which it slides, a flexible sleeve in the recess in each valve ring, and control means for supplying motive fluid under pressure from the gas generator to the annular recess to press the flexible sleeve against the wall to cover the orifice ports it overlies.

8. A rocket engine in accordance with claim 2 in which the tanks are formed by walls in the rocket engine, connections between the separate tanks and the separate walls having orifice ports therein through which the propellants flow, means for delivering motive fluid under pressure from the gas generator to the tanks to pressurize the liquid propellants and force them into the combustion chamber, and control means for controlling the flow of motive fluid to the tanks.

References Cited

UNITED STATES PATENTS

| | | | |
|---|---|---|---|
| 2,919,543 | 1/1960 | Sherman | 137—607 |
| 2,946,236 | 7/1960 | Joseph | 137—607 |
| 3,043,477 | 7/1962 | Trumbull | 137—607 |
| 3,064,903 | 11/1962 | Butler | 60—258 |
| 3,205,656 | 9/1965 | Elverum | 60—258 |

MARTIN P. SCHWADRON, *Primary Examiner.*

DOUGLAS HART, *Assistant Examiner.*

U.S. Cl. X.R.

60—240; 137—607; 307—305, 252